United States Patent
Oh et al.

(10) Patent No.: US 10,240,258 B2
(45) Date of Patent: Mar. 26, 2019

(54) THERMAL ENERGY STORAGE AND HEAT INSULATION POLYESTER FIBER, AND PREPARATION METHOD THEREFOR

(71) Applicant: HYOSUNG TNC CORPORATION, Seoul (KR)

(72) Inventors: Sung Jin Oh, Anyang-si (KR); Min Suk Lee, Anyang-si (KR)

(73) Assignee: HYOSUNG TNC CORPORATION, Seoul (KR)

( * ) Notice: Subject to any disclaimer, the term of this patent is extended or adjusted under 35 U.S.C. 154(b) by 0 days.

(21) Appl. No.: 15/509,918

(22) PCT Filed: Aug. 26, 2015

(86) PCT No.: PCT/KR2015/008907
§ 371 (c)(1),
(2) Date: Mar. 9, 2017

(87) PCT Pub. No.: WO2016/047928
PCT Pub. Date: Mar. 31, 2016

(65) Prior Publication Data
US 2017/0306530 A1    Oct. 26, 2017

(30) Foreign Application Priority Data

Sep. 26, 2014 (KR) ........................ 10-2014-0129230

(51) Int. Cl.
*G02B 5/20* (2006.01)
*D01F 1/02* (2006.01)
(Continued)

(52) U.S. Cl.
CPC ............. *D01F 1/02* (2013.01); *C08K 3/2279* (2013.01); *D01F 1/10* (2013.01); *D01F 6/62* (2013.01)

(58) Field of Classification Search
CPC .................................... D01F 1/08; D01F 1/10
(Continued)

(56) References Cited

U.S. PATENT DOCUMENTS 9,938,642 B2 * 4/2018 Oh ............................ D01F 1/08
2008/0308775 A1 * 12/2008 Yabuki ...................... D01F 1/10
252/587

FOREIGN PATENT DOCUMENTS

EP    302141    2/1989
JP    03-69675    3/1991
(Continued)

OTHER PUBLICATIONS

International Search Report, issued in the corresponding International PCT application No. PCT/KR2015/008907, dated Dec. 3, 2015, 5 pages.

*Primary Examiner* — Khanh T Nguyen
(74) *Attorney, Agent, or Firm* — Hamre, Schumann, Mueller & Larson, P.C.

(57) ABSTRACT

The present invention is directed to a method for preparing a polyester fiber, the method including: mixing 5-50 wt % of composite metal oxide particles, including a tungsten-based oxide, a cesium-based oxide, an antimony-based oxide, an indium-based oxide, and a tin-based oxide, with 40-90 wt % of one or two types of organic solvents selected from among alcohol, ketone, and acetates, 0.4-20 wt % of polyvinyl butyral, i.e., polymer, and 2-30 wt % of calcium stearate or magnesium stearate to obtain a mixture, and stirring and grinding the mixture to prepare a dispersion liquid; drying the dispersion liquid to prepare a powdered additive; mixing 1-30 wt % of the additive with polyester chips to obtain a mixture and melting this mixture to prepare master batch chips; and mixing 1-10 wt % of the master batch chips with general polyester chips to obtain a mixture, and melting and spinning this mixture.

10 Claims, 4 Drawing Sheets

(51) Int. Cl.
  *D01F 1/10* (2006.01)
  *C08K 3/22* (2006.01)
  *D01F 6/62* (2006.01)

(58) Field of Classification Search
  USPC .......................................................... 252/587
  See application file for complete search history.

(56) References Cited

FOREIGN PATENT DOCUMENTS

| | | | | |
|---|---|---|---|---|
| JP | 2012-172133 | | 9/2012 | |
| KR | 10-1995-020757 | | 7/1995 | |
| KR | 10-1997-0006375 | | 2/1997 | |
| KR | 100792118 | * | 1/2008 | ............. D01D 5/253 |
| KR | 10-0926588 | | 11/2009 | |
| KR | 10-2012-0076909 | | 7/2012 | |
| KR | 10-1354261 | | 2/2014 | |

* cited by examiner

1. Temperature/humidity chamber: EBR (Walk-in Type), Espec
2. Thermometer: Cat, TNB-200(LT-8B), Gram
3. Light source: 220V/500W/3200K bulb (Iwasaki Co.)
4. Irradiation distance: 50 cm
5. Surface to be irradiated: surface
6. Surface to be measured: back surface
7. Irradiation time: 60 min
8. Temperature and humidity in chamber: (15±1) °C, (65±4)% RH

THERMAL ENERGY STORAGE AND HEAT INSULATION POLYESTER FIBER, AND PREPARATION METHOD THEREFOR

TECHNICAL FIELD

The present invention relates to a heat-storing and retaining polyester fiber and a method for preparing the same, and more particularly to a polyester fiber having excellent fiber heat-storing and retaining performance and excellent persistence thereof, in which a tungsten-based oxide, a cesium-based oxide, an antimony-based oxide, an indium-based oxide, and a tin-based oxide are incorporated and spun into a yarn, and a method for preparing the same.

BACKGROUND ART

Recently, in line with the trend toward high-quality fiber products, various types of functional fibers have been marketed. In an effort to meet the trend, research into heat-storing and retaining fibers and the technical development thereof has been actively conducted.

In connection with this, European Patent No. 302141 discloses a heat-storing and retaining polyester fiber which contains fine zirconium carbide particles. However, fine zirconium carbide particles have a disadvantage in that they cannot provide fabric products having various colors because they take on a gray or black color when being incorporated into blended yarns.

Furthermore, Japanese Unexamined Patent Application Publication No. Hei 3-69675 discloses a method for producing a staple fiber by kneading 40 wt % of a fine ceramic powder, such as zirconium oxide, silicon oxide, aluminum oxide or the like, to prepare master chips, mixing the master chips with regular chips to obtain a mixture, and spinning the mixture. However, although the staple fiber has good whiteness, it has a disadvantage in that the production of filaments is difficult because the dispersibility of a large amount of ceramic particles is poor.

Furthermore, Korean Patent Application Publication No. 10-1995-020757 discloses a method for producing a far-infrared polyester fiber, the method including: mixing at least two or more types of fine far-infrared ceramic powders to obtain a mixture, adding 0.5-9.0 wt % of the mixture to a polymer; preparing a slurry of ethylene glycol by using a high-speed mixer; introducing the slurry into an ester reaction tube; and kneading the introduced slurry. The method has a problem in that the method causes the abrasion of polymerization, spinning and post-processing apparatuses and various types of guides because a main component is a zirconium oxide-based material and thus has high hardness.

Furthermore, Korean Patent No. 0926588 discloses a method for producing a spun yarn, the method including: uniformly mixing $Cs_{0.33}WO_3$ with a polyester resin to prepare master batches; mixing, melting and spinning the master batches; elongating the master batches to prepare a multi-filament fiber; and cutting the multi-filament fiber into staple fibers. However, the present method has disadvantages in that the method can be used only for the preparation of a spun yarn because the dispersion of the additive is poor and in that a heat-storing and retaining effect is present but the persistence thereof is poor due to the characteristics of the additive.

DISCLOSURE

Technical Problem

The present invention is intended to overcome the above-described problems of the conventional art, and an object of the present invention is to provide a polyester fiber exhibiting excellent heat-storing and retaining performance and having excellent persistence thereof, and a method for preparing the same.

Another object of the present invention is to provide a yarn having excellent spinning processability, excellent fiber processability such as false-twisting processability, and excellent dyeability while having excellent heat-storing and retaining performance, and a fabric product using the same.

Technical Solution

In order to accomplish the above objects, an aspect of the present invention is directed to a polyester fiber including 0.01-2 wt % of composite metal oxide particles in which a tungsten-based oxide, a cesium-based oxide, an antimony-based oxide, an indium-based oxide, and a tin-based oxide are mixed.

In the polyester fiber according to an embodiment of the present invention, the composite metal oxide particles may include, based on 100 parts by weight of $WO_3$, 3-20 parts by weight of $Cs_2O$, 1-10 parts by weight of $Sb_2O_3$, 0.5-5 parts by weight of $In_2O_3$, and 0.1-1 part by weight of $SnO_2$, and the polyester fiber may have a single-fiber fineness of 0.5-3 denier.

In order to accomplish the above objects, another aspect of the present invention is directed to a method for preparing a polyester fiber, the method including: mixing 5-50 wt % of composite metal oxide particles, including a tungsten-based oxide, a cesium-based oxide, an antimony-based oxide, an indium-based oxide, and a tin-based oxide, with 40-90 wt % of one or two types of organic solvents selected from among alcohol, ketone, and acetates, 0.4-20 wt % of polyvinyl butyral, i.e., polymer, and 2-30 wt % of calcium stearate or magnesium stearate to obtain a mixture, and stirring and grinding the mixture to prepare a dispersion liquid; drying the dispersion liquid to prepare a powdered additive; mixing 1-30 wt % of the additive with polyester chips to obtain a mixture and melting this mixture to prepare master batch chips; and mixing 1-10 wt % of the master batch chips with general polyester chips to obtain a mixture, and melting and spinning this mixture.

In the method for preparing a polyester fiber according to an embodiment of the present invention, the polyester chips used in the preparation of the master batch chips may have an intrinsic viscosity of 0.60-0.70 dl/g, and the additive included in the master batch chips may have an average particle size of 2 μm or less.

In the method for preparing a polyester fiber according to an embodiment of the present invention, the organic solvents may be a mixture of one or two types of materials selected from among alcohol, ketone, and acetone, and the spinning of the mixture may be performed using a spinning nozzle having a C-shaped cross section.

Advantageous Effects

The composite functional polyester fiber prepared by the preparation method according to the present invention has effects in that a heat-storing and retaining effect is increased by +3° C. or higher (based on lamp tests), a heat-storing and retaining function lasts for 10 minutes or longer (based on lamp tests), 95% or more of long-fiber yarn production processability is implemented, and 95% or more of dyeing M % is implemented.

BEST MODE

Embodiments of the present invention will be described in greater detail below with reference to examples and so forth. Furthermore, in the description of the present invention, detailed descriptions of related well-known general-purpose functions or configurations will be omitted.

An aspect of the present invention is directed to a polyester fiber including 0.01-2.00 wt % of composite metal oxide particles in which a tungsten-based oxide, a cesium-based oxide, an antimony-based oxide, an indium-based oxide, and a tin-based oxide are mixed.

In the polyester fiber according to an embodiment of the present invention, the composite metal oxide particles may include, based on 100 parts by weight of $WO_3$, 3-20 parts by weight of $Cs_2O$, 1-10 parts by weight of $Sb_2O_3$, 0.5-5.0 parts by weight of $In_2O_3$, and 0.1-1.0 part by weight of $SnO_2$.

Another aspect of the present invention is directed to a method for preparing a polyester fiber, the method including the steps of: mixing 5-50 wt % of composite metal oxide particles, including a tungsten-based oxide, a cesium-based oxide, an antimony-based oxide, an indium-based oxide, and a tin-based oxide, with 40-90 wt % of an organic solvent, 0.4-20.0 wt % of polyvinyl butyral, and 2-30 wt % of calcium stearate or magnesium stearate particles to obtain a mixture, and stirring and grinding the mixture to prepare a dispersion liquid; drying the dispersion liquid to prepare a powdered additive; mixing 1-30 wt % of the additive with polyester chips to obtain a mixture and melting this mixture to prepare master batch chips; and mixing 1-10 wt % of the master batch chips with general polyester chips to obtain a mixture, and melting and spinning this mixture.

Figure 1:
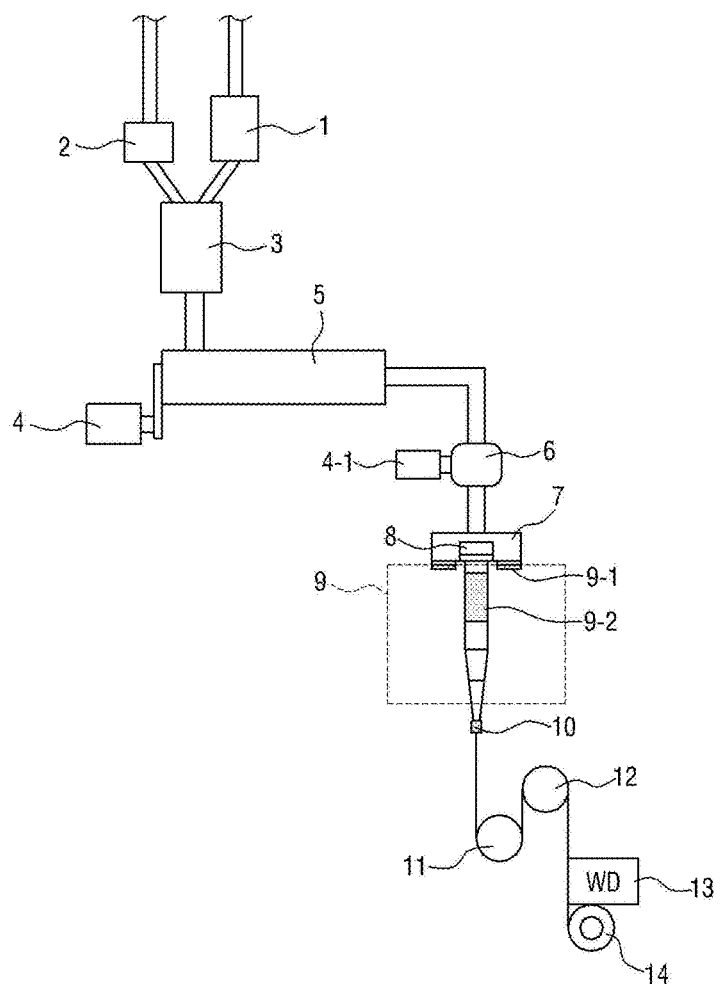
FIG. 1 is a schematic diagram of a mixed melt spinning apparatus which is used for a preparation method according to the present invention.

FIG. 1 is a schematic diagram of a mixed melt spinning apparatus which is used for the preparation method according to the present invention. The preparation method according to the present invention is now described in greater detail with reference to FIG. 1. First, 5-50 wt % of composite metal oxide particles, including, based on 100 parts by weight of $WO_3$, 3-20 parts by weight of $Cs_2O$, 1-10 parts by weight of $Sb_2O_3$, 0.5-5.0 parts by weight of $In_2O_3$, and 0.1-1.0 part by weight of $SnO_2$, are mixed with 40-90 wt % of one or two types of organic solvents selected from among alcohol, ketone, and acetate, 0.4-20.0 wt % of polyvinyl butyral (a first dispersing agent), i.e., a polymer, and 2-30 wt % of calcium stearate or magnesium stearate (a second dispersing agent). The mixture is stirred and ground at a temperature of 20-60° C. for 10-20 hours by a super-revolution zirconia milling machine, i.e., a high-viscosity homogenizer, so that the diameters of particles obtained through the stirring and the grinding become 10-50 nm or less, thereby preparing a dispersion liquid.

Thereafter, the dispersion liquid is dried at a temperature of 50-90° C. for 8-16 hours to prepare a powdered additive.

1-30 weights of the additive is mixed with polyester chips having an intrinsic viscosity of about 0.60-0.70 dl/g to obtain a mixture, and the mixture is melted and mixed at 280-300° C. by a twin extruder, thereby preparing master batch chips. In this case, the heat-storing and retaining additive preferably has an average particle size of 2 μm or less when the average particle size is measured by using an electron microscope.

1-10 wt % of the obtained master batch chips having a heat-storing and retaining function are automatically mixed with general polyester chips by an auto blender 3 to obtain a mixture, the mixture is melted by an extruder 5, and the melted mixture is transferred to a spinning nozzle 8 by a polymer melting pump 6.

A nozzle having a C-shaped cross section is preferably used as the spinning nozzle 8 so that a fiber can contain an air layer in order to improve the heat-retaining function of the fiber. The fiber spun via the spinning nozzle 8 is cooled while passing through a cooling device 9, passes through first and second godet rollers 11 and 12, and is wound by a winding device 13.

The wound polyester fiber preferably has a heat-storing and retaining inorganic particle (composite metal oxide particle) content of 0.01-2.00 wt % in the fiber and a single-fiber fineness of 0.5-3 denier. When the content of the heat-storing and retaining inorganic particles is less than 0.01 wt %, the problem of a decrease in heat-storing and retaining functionality arises. In contrast, when the content of the heat-storing and retaining inorganic particles exceeds 2 wt %, the problems of an increase in pack pressure and a decrease in spinning processability arise. Accordingly, these cases are not preferable. Furthermore, when the single-fiber fineness of the fiber is less than 0.5 denier, a spin pack filter needs to be configured to be dense, and thus the pack pressure increases due to an additive, thereby causing problems in that a pack replacement period is reduced and spinning processability is degraded. In contrast, when the single-fiber fineness of the fiber exceeds 3 denier, a problem arises in that the wearing sensation of clothing is degraded.

The method for preparing a heat-storing and retaining polyester fiber according to the present invention will be described in greater detail below with reference to examples. However, this description is intended merely to illustrate the present invention, and the scope of the present invention should not be limitedly interpreted by the description.

Example 1

20 g of composite metal oxide particles, including, based on 100 parts by weight of $WO_3$, 5 parts by weight of $Cs_2O$, 2 parts by weight of $Sb_2O_3$, 1 part by weight of $In_2O_3$, and 0.5 part by weight of $SnO_2$, were mixed with 120 g of alcohol, 10 g of polyvinyl butyral, i.e. a polymer, and 20 g of calcium stearate to obtain a mixture. The mixture was stirred and ground at a temperature of 30° C. for 10 hours by using a super-revolution zirconia milling machine, i.e., a high-viscosity homogenizer, so that the diameters of particles obtained through the stirring and the grinding were 10-50 nm or less, thereby preparing a dispersion liquid. The dispersion liquid was dried at 70° C. for 9 hours to prepare a powdered heat-storing and retaining additive. The average particle size of the obtained powder was 1-2 μm.

Thereafter, the obtained functional powder was mixed with general polyester (intrinsic viscosity: 0.64 dl/g) to obtain a mixture, and the mixture was melted, thereby preparing master batch chips having a functional powder content of 5 wt %. The master batch chips were mixed with general polyester (intrinsic viscosity: 0.64 dl/g) at a weight ratio of 4:96 so that the concentration of the functional powder in the fiber became 0.2 wt % to obtain a mixture. The mixture was spun at 295° C. and a speed of 2,450 m/min by the spinning apparatus of FIG. 1, a central Rotational Outflow Quenching (ROQ) apparatus, and a nozzle-warming heater, and the spun mixture was false-twisted at a false-twist draw rate of 1.65 by common non-contact false-twist equipment, thereby producing a 65-denier/108-filament false-twist fiber having the C-shaped cross section of FIG. 2. A nozzle having a C shape was used as a spinning nozzle so that an air layer could be contained in order to improve the heat-retaining function of the fiber, the master batch chips were fed by a separate feeding and mixing device disposed before a melt extruder, and the physical properties, processability, and functionality of the obtained functional polyester fiber were evaluated. The results of the evaluation are shown in Table 1 below.

Example 2

A functional powder obtained in the same manner as in Example 1 was mixed with general polyester (intrinsic viscosity: 0.64 dl/g) to obtain a mixture, and the mixture was melted, thereby preparing master batch chips having a functional powder content of 10 wt %. The master batch chips were mixed with general polyester (intrinsic viscosity: 0.64 dl/g) at a weight ratio of 3:97 so that the concentration of the functional powder in a fiber became 0.3 wt %. The mixture was spun at 295° C. and a speed of 2,600 m/min by the spinning apparatus of FIG. 1, a central Rotational Outflow Quenching (ROQ) apparatus, and a nozzle-warming heater, and the spun mixture was false-twisted at a false-twist draw rate of 1.65 by common non-contact false-twist equipment, thereby producing a 65-denier/72-filament false-twist fiber having the C-shaped cross section of FIG. 2. A nozzle having a C shape was used as a spinning nozzle so that an air layer could be contained in order to improve the heat-retaining function of the fiber, the master batch chips were fed by using a separate feeding and mixing device disposed before a melt extruder, and the physical properties, processability, and functionality of the obtained functional polyester fiber were evaluated. The results of the evaluation are shown in Table 1 below.

Comparative Example 1

20 g of composite metal oxide particles, including, based on 100 parts by weight of $WO_3$, 5 parts by weight of $Cs_2O$ and 0.5 part by weight of $Sb_2O_3$ and $SnO_2$, were mixed with 100 g of alcohol, 2 g of polyvinyl butyral, i.e., a polymer, and 10 g of calcium stearate to obtain a mixture. The mixture was stirred and ground at a temperature of 30° C. for 10 hours by a super-revolution zirconia milling machine, i.e., a high-viscosity homogenizer, so that the diameters of particles obtained through the stirring and the grinding became 10-50 nm or less, thereby preparing a dispersion liquid. The dispersion liquid was dried at 70° C. for 9 hours to prepare a powdered heat-storing and retaining additive. The average particle size of the obtained powder was 1-2 μm.

The obtained functional powder was mixed with general polyester (intrinsic viscosity: 0.64 dl/g) to obtain a mixture, and the mixture was melted, thereby preparing master batch chips having a functional powder content of 5 wt %. The master batch chips were mixed with general polyester (intrinsic viscosity: 0.64 dl/g) at a weight ratio of 4:96 so that the concentration of the functional powder in a fiber became 0.2 wt %. This mixture was spun at 295° C. and a speed of 2,450 m/min by the spinning apparatus of FIG. 1, a central Rotational Outflow Quenching (ROQ) apparatus, and a nozzle-warming heater, and the spun mixture was false-twisted at a false-twist draw rate of 1.65 by common non-contact false-twist equipment, thereby producing a 65-denier/108-filament false-twist fiber having the C-shaped cross section of FIG. 2. A nozzle having a C shape was used as a spinning nozzle so that an air layer could be contained in order to improve the heat-retaining function of the fiber, the master batch chips were fed by a separate feeding and mixing device disposed before a melt extruder, and the physical properties, processability, and functionality of the obtained functional polyester fiber were evaluated. The results of the evaluation are shown in Table 1 below.

Comparative Example 2

A common tungsten-cesium oxide ($Cs_{0.33}WO_3$) powder was mixed with general polyester (intrinsic viscosity: 0.64 dl/g) to obtain a mixture, and the mixture was melted, thereby preparing master batch chips (hereinafter MB chips) having a functional powder content of 10 wt %. The master batch chips were mixed with general polyester (intrinsic viscosity: 0.64 dl/g) at a weight ratio of 3:97 to obtain a mixture so that the concentration of the functional powder in a fiber became 0.3 wt %. The mixture was spun at 295° C. and a speed of 2,600 m/min by the spinning apparatus of FIG. 1, a central Rotational Outflow Quenching (ROQ) apparatus, and a nozzle-warming heater, and the spun mixture was false-twisted at a false-twist draw rate of 1.65 by common non-contact false-twist equipment, thereby producing a 65-denier/72-filament false-twist fiber having the C-shaped cross sections of FIG. 2. A nozzle having a C shape was used as a spinning nozzle so that an air layer could be contained in order to improve the heat-retaining function of the fiber, the master batch chips were fed by a separate feeding and mixing device disposed before a melt extruder, and the physical properties, processability, and functionality of the obtained functional polyester fiber were evaluated. The results of the evaluation are shown in Table 1 below.

Comparative Example 3

Figure 2:
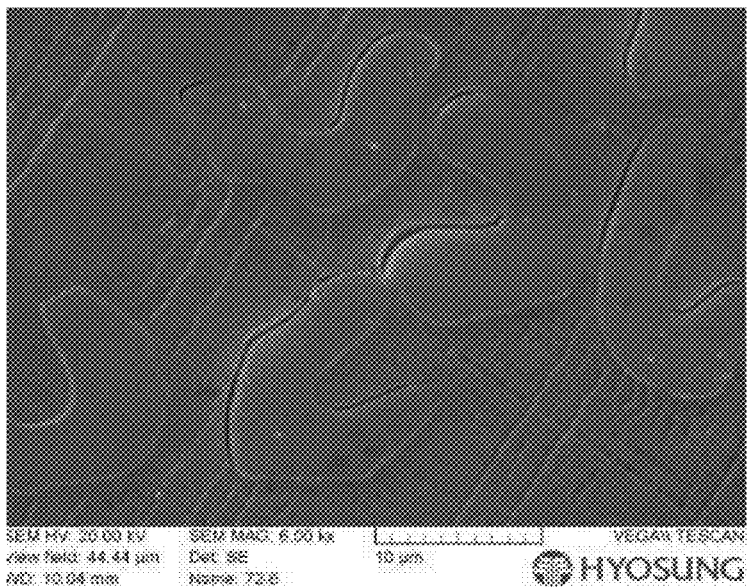
FIG. 2 shows an example of the cross section of a fiber prepared by the preparation method according to the present invention.

General polyester chips (intrinsic viscosity: 0.64 dl/g) were spun at 295° C. and a speed of 2,450 m/min by the spinning apparatus of FIG. 1, a central Rotational Outflow Quenching (ROQ) apparatus, and a nozzle-warming heater, and the spun chips were false-twisted at a false-twist draw rate of 1.63 by common non-contact false-twist equipment, thereby producing a 65-denier/108-filament false-twist fiber having the C-shaped cross section of FIG. 2. The physical properties, processability, and functionality of the obtained functional polyester fiber were evaluated. The results of the evaluation are shown in Table 1 below.

TABLE 1

| Item | Example 1 | Example 2 | Comparative Example 1 | Comparative Example 2 | Comparative Example 3 |
|---|---|---|---|---|---|
| Content of functional powder particles in yarn (wt %) | 0.2 | 0.3 | 0.2 | 0.3 | — |
| Feeding of master batch chips | 0 | 0 | 0 | 0 | — |
| Spinning temperature (° C.) | 295 | 295 | 295 | 295 | 295 |
| Spinning speed (m/min) | 2,450 | 2,600 | 2,450 | 2,600 | 2,450 |
| False-twist draw rate | 1.65 | 1.65 | 1.65 | 1.65 | 1.63 |
| False-twist temperature (non-contact type; ° C.) | 220 | 220 | 220 | 220 | 220 |
| False-twist speed (m/min) | 500 | 500 | 500 | 500 | 500 |
| Denier/filament number | 65/108 | 65/72 | 65/108 | 65/72 | 65/108 |
| Temperature rise (° C.) | 23.3 | 23.9 | 23.2 | 22.2 | 18.9 |
| Heat-storing and retaining property A (temperature; ° C.) | 4.4 | 5.0 | 4.3 | 3.0 | — |
| Heat-storing and retaining property B (temperature; ° C.) | 1.8 | 2.1 | 0.3 | 0.2 | — |
| Shape of cross section | C shape | C shape | C shape | C shape | O shape |

Heat-Storing and Retaining Performance (Reference Lamp Method)

Fabric samples each having a width of 30 cm and a length of 30 cm were prepared and allowed to stand in an artificial climate chamber (temperature: 20±2° C.; relative humidity: 65±4%) for 2 hours. Thereafter, temperature sensors were attached to the respective lower surfaces of the fabric samples, a 500 W light source located at a distance of 50 cm from the fabric sample was turned on, the fabric samples were irradiated with light for 30 minutes, and then the light source was turned off. The temperatures of the fabric samples were measured at intervals of 1 minute for 30 minutes and a total of 60 minutes, and then calculations were performed, as shown in the following equations.

Temperature rise (° C.): temperature of fabric sample after light irradiation−temperature of fabric sample before light irradiation;   1)

Thermal storage/insulation property A (temperature (° C.)): Temperature rise of test sample−temperature rise of control sample   2)

Thermal storage/insulation property B (temperature (° C.)): Temperature rise of test sample after 5 minutes after turning off the light source at the moment of 30 minutes light irradiation−temperature rise of control sample   3)

Figure 3:
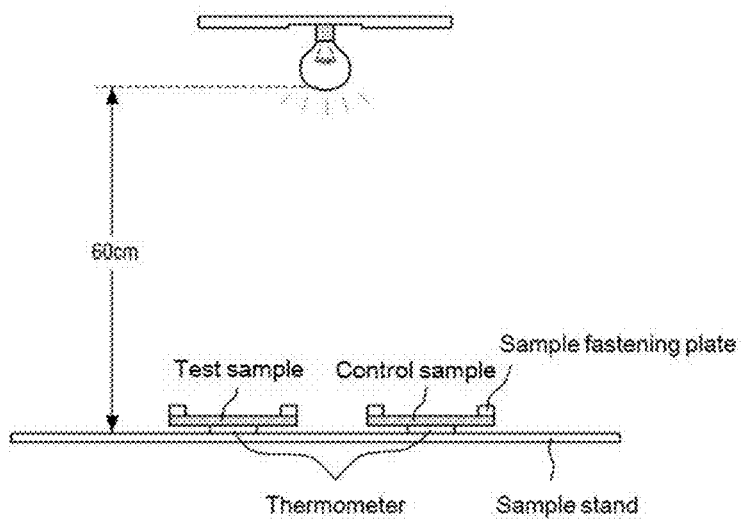
FIG. 3 is a schematic diagram of measuring equipment for measuring the heat-storing and retaining function of the fiber prepared by the preparation method according to the present invention.
Figure 4:
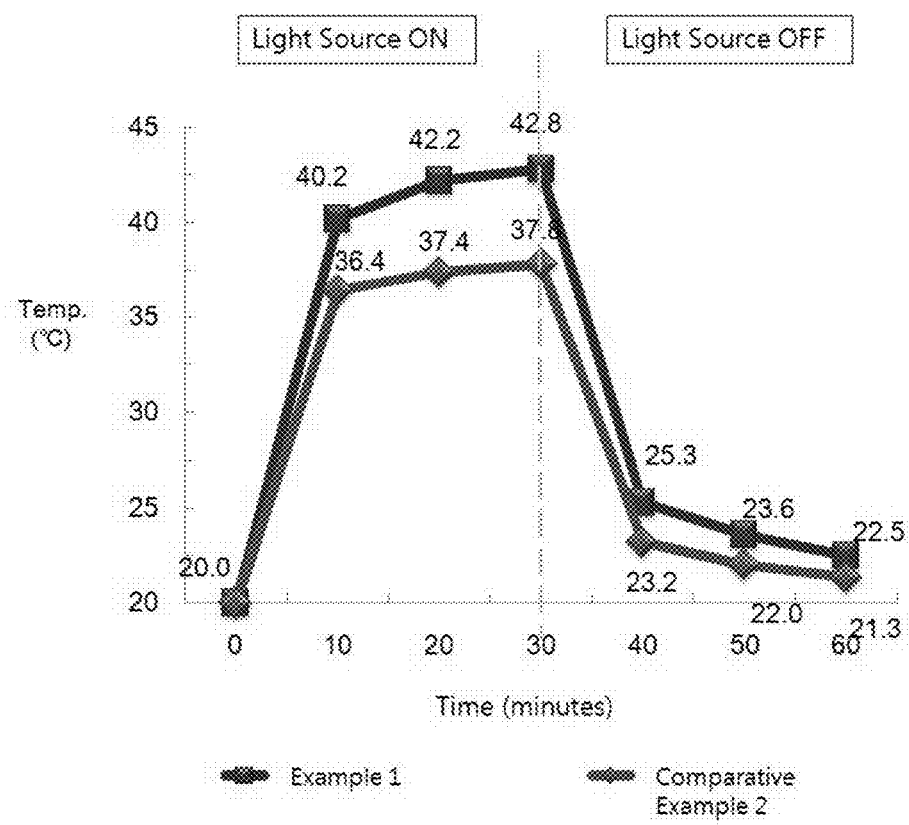
FIG. 4 shows an example of the results of measurement of the heat-storing and retaining performance of dyed, knitted sock fabric using the fiber prepared by the preparation method according to the present invention.

A schematic diagram of equipment for measuring heat-storing and retaining performance and test conditions are shown in FIG. 3. The changes in surface temperature of dyed knitted sock fabrics (produced in Example 2 and Comparative Example 2) caused by light irradiation are illustrated in FIG. 4 in the form of a graph.

As can be seen from Table 1, the composite functional polyester fiber prepared by using the preparation method according to the present invention exhibited effects in that a heat-storing and retaining effect was increased by 3° C. or higher, a heat-storing and retaining function lasted for 10 minutes or longer, 95% or more of long-fiber yarn production processability was implemented, and 95% or more of dyeing M % was implemented.

While the present invention has been described in detail with reference to the preferred examples of the present invention, the present invention is not limited to the above-described examples, and it will be apparent that various modifications can be made by those skilled in the art to which the present invention pertains within the range of the technical spirit of the present invention.

The invention claimed is:

1. A polyester fiber comprising 0.01-2 wt % of composite metal oxide particles in which a tungsten-based oxide, a cesium-based oxide, an antimony-based oxide, an indium-based oxide, and a tin-based oxide are mixed.

2. The polyester fiber of claim 1, wherein the composite metal oxide particles comprise, based on 100 parts by weight of $WO_3$, 3-20 parts by weight of $Cs_2O$, 1-10 parts by weight of $Sb_2O_3$, 0.5-5 parts by weight of $In_2O_3$, and 0.1-1 part by weight of $SnO_2$.

3. The polyester fiber of claim 1, wherein the polyester fiber has a single-fiber fineness of 0.5-3 denier.

4. A fabric product using a polyester fiber, wherein the polyester fiber is the polyester fiber set forth in claim 1.

5. A method for preparing a polyester fiber, the method comprising:
    mixing 5-50 wt % of composite metal oxide particles, including a tungsten-based oxide, a cesium-based oxide, an antimony-based oxide, an indium-based oxide, and a tin-based oxide, with 40-90 wt % of one or two types of organic solvents selected from among alcohol, ketone, and acetates, 0.4-20 wt % of polyvinyl butyral, i.e., polymer, and 2-30 wt % of calcium stearate or magnesium stearate to obtain a mixture, and stirring and grinding the mixture to prepare a dispersion liquid;
    drying the dispersion liquid to prepare a powdered additive;
    mixing 1-30 wt % of the additive with polyester chips to obtain a mixture and melting this mixture to prepare master batch chips; and
    mixing 1-10 wt % of the master batch chips with general polyester chips to obtain a mixture, and melting and spinning this mixture.

6. The method of claim 5, wherein the composite metal oxide particles comprise, based on 100 parts by weight of $WO_3$, 3-20 parts by weight of $Cs_2O$, 1-10 parts by weight of $Sb_2O_3$, 0.5-5 parts by weight of $In_2O_3$, and 0.1-1 part by weight of $SnO_2$.

7. The method of claim 5, wherein the polyester chips used in the preparation of the master batch chips have an intrinsic viscosity of 0.60-0.70 dl/g.

8. The method of claim 5, wherein the additive included in the master batch chips has an average particle size of 2 μm or less.

9. The method of claim 5, wherein the organic solvents are a mixture of one or two types of materials selected from among alcohol, ketone, and acetone.

10. The method of claim 5, wherein the spinning of the mixture is performed using a spinning nozzle having a C-shaped cross section.

\* \* \* \* \*